(12) United States Patent
Hendrickson (10) Patent No.: US 6,276,392 B1
(45) Date of Patent: Aug. 21, 2001

(54) LIQUID PRESSURE REGULATOR

(75) Inventor: David L. Hendrickson, Riverside, CA (US)

(73) Assignee: Hendrickson Bros., Corona, CA (US)

( * ) Notice: Subject to any disclaimer, the term of this patent is extended or adjusted under 35 U.S.C. 154(b) by 0 days.

(21) Appl. No.: 09/496,141

(22) Filed: Feb. 1, 2000

(51) Int. Cl.[7] ................................................. F16K 31/12
(52) U.S. Cl. ........................ 137/505.38; 137/505.13; 137/505.18; 137/271
(58) Field of Search ........................ 137/271, 505.38, 137/505.18, 505.13

(56) References Cited

U.S. PATENT DOCUMENTS

| | | |
|---|---|---|
| 383,877 | 6/1888 | Gale et al. . |
| 1,399,013 | 12/1921 | Fleener . |
| 2,478,040 | 8/1949 | Campbell, Jr. et al. . |
| 2,760,507 | 8/1956 | Miller . |
| 3,128,086 | 4/1964 | Wolfhope . |
| 3,338,264 | 8/1967 | Dykzeul et al. . |
| 3,451,431 | 6/1969 | Royer . |
| 3,730,215 | 5/1973 | Conery et al. . |
| 3,747,629 | 7/1973 | Bauman . |
| 3,825,029 | 7/1974 | Genbauffe . |
| 3,948,285 | 4/1976 | Flynn . |
| 4,606,371 | * 8/1986 | Maekawa .......................... 137/270 |
| 4,716,929 | 1/1988 | Tomer . |
| 4,905,723 | * 3/1990 | Pritchard et al. .................. 137/71 |
| 4,909,269 | * 3/1990 | Pritchard et al. .................. 137/71 |
| 5,010,740 | 4/1991 | Backus et al. . |
| 5,042,697 | 8/1991 | Warren . |
| 5,232,160 | 8/1993 | Hendrickson et al. . |
| 5,330,376 | * 7/1994 | Okumura .......................... 440/88 |
| 5,392,807 | 2/1995 | Caudle et al. . |

* cited by examiner

Primary Examiner—A. Michael Chambers
Assistant Examiner—Thomas L. McShane
(74) Attorney, Agent, or Firm—Knobbe, Martens, Olson & Bear, LLP

(57) ABSTRACT

A pressure regulator is provided that can produce a relatively constant outlet pressure over a range of flow rates. A spring backed diaphragm reacts against the inlet pressure to produce this desired outlet pressure. To provide a range of outlet pressures with a variety of inlet pressures, a spring may be selected from a set of springs having different strength characteristics. The regulator includes a housing with the liquid inlet being located at 90° with respect to the liquid outlet and with a dry chamber on the back side of the diaphragm in which the spring is positioned. Thus, it is easy to remove a cap enclosing the dry chamber and position the desired spring within that chamber. For handling even higher output pressures, a pair of springs may be concentrically positioned in the dry chamber of the housing to react against the inlet pressure.

15 Claims, 10 Drawing Sheets

10 PSI = WHITE
15 PSI = RED
20 PSI = YELLOW
25 PSI = ORANGE
30 PSI = BLUE
35 PSI = GREEN

PR 7025  PERFORMANCE DATA

| | | 20 | 30 | 40 | 60 | 80 | 100 | 120 | 140 | 160 |
|---|---|---|---|---|---|---|---|---|---|---|
| 25 PSI OUTPUT | | | | | | | | | | |
| F | 1GPM | 20 | 27 | 28 | 28 | 29 | 30 | 30 | 31 | 32 |
| L | 2.5 | 20 | 27 | 27 | 27 | 28 | 28 | 28 | 29 | 30 |
| O | 5 | 19 | 27 | 27 | 27 | 27 | 27 | 27 | 28 | 28 |
| W | 10 | 19 | 25 | 27 | 27 | 27 | 27 | 27 | 27 | 28 |
| | 20 | 17 | 22 | 24 | 25 | 26 | 26 | 26 | 26 | 27 |
| | 35 | 12 | 17 | 21 | 22 | 24 | 25 | 25 | 25 | 26 |

*FIG. 5D*

PR 7030  PERFORMANCE DATA

INPUT PRESSURE (PSI)

| | | 20 | 30 | 40 | 60 | 80 | 100 | 120 | 140 | 160 |
|---|---|---|---|---|---|---|---|---|---|---|
| 30 PSI OUTPUT | | | | | | | | | | |
| F | 1GPM | 19 | 29 | 31 | 32 | 33 | 33 | 34 | 35 | 36 |
| L | 2.5 | 19 | 29 | 31 | 31 | 31 | 32 | 32 | 33 | 34 |
| O | 5 | 19 | 28 | 31 | 31 | 31 | 31 | 31 | 32 | 33 |
| W | 10 | 19 | 25 | 30 | 30 | 31 | 31 | 31 | 32 | 32 |
| | 20 | 17 | 24 | 28 | 29 | 30 | 30 | 30 | 31 | 31 |
| | 35 | 13 | 19 | 24 | 27 | 28 | 28 | 29 | 29 | 30 |

*FIG. 5E*

PR 7035  PERFORMANCE DATA

INPUT PRESSURE (PSI)

| | | 20 | 30 | 40 | 60 | 80 | 100 | 120 | 140 | 160 |
|---|---|---|---|---|---|---|---|---|---|---|
| 35 PSI OUTPUT | | | | | | | | | | |
| F | 1GPM | 20 | 30 | 37 | 37 | 38 | 39 | 39 | 40 | 42 |
| L | 2.5 | 20 | 30 | 36 | 37 | 37 | 37 | 38 | 38 | 39 |
| O | 5 | 20 | 29 | 36 | 36 | 36 | 36 | 37 | 37 | 38 |
| W | 10 | 19 | 28 | 34 | 36 | 36 | 36 | 36 | 36 | 36 |
| | 20 | 18 | 26 | 32 | 34 | 35 | 35 | 35 | 35 | 36 |
| | 35 | 14 | 20 | 27 | 30 | 32 | 33 | 33 | 33 | 34 |

LIQUID PRESSURE REGULATOR

BACKGROUND OF THE INVENTION

1. Field of the Invention

This invention relates to pressure regulators particularly for use with water distribution systems.

2. Description of the Related Art

In irrigation systems, sprinkler heads, drip irrigation outlets, or other elements affect the outlet waterflow. Water sources are provided at a variety of pressures and the pressure in a given system may vary as consumption varies. There are limits on pressure that sprinkler heads, drip irrigation elements and electrical flow control valves can withstand, and these limits vary widely. These elements function best when subjected to a preset water pressure. Thus, it is common to provide pressure regulators in water lines to provide a relatively constant pressure over a range of input pressure. The volume flowing through a regulator is also variable depending on the number and type of downstream outlets. Thus, it is desirable that the pressure regulator provide a relatively constant outlet pressure under a variety of input pressures and a range of flow through the regulator.

One type of pressure regulator currently being utilized to satisfy the foregoing needs is the so-called "inline" regulator. Such pressure regulators have two main disadvantages. First, the mechanism such as a spring used to regulate the flow is in the flow path. Consequently, the spring is subject to wear, thus diminishing performance and useful life. If the spring must be changed, the regulator must be disconnected from the water line. More importantly, if a different outlet pressure is desired, the entire regulator must be removed from the water line and replaced by one providing the desired outlet pressure.

This approach is inconvenient and expensive to the user because of the time required to replace the pressure regulator as well as the expense of purchasing many different pressure regulators. Correspondingly, dealers that sell regulators to end users are forced to keep many different pressure regulators in inventory, and endure the undesirable inventory expense and space. Likewise, manufacturers must produce and inventory this wide range of regulators.

Thus, a need exist for a pressure regulator system that eliminates or minimizes these shortcomings.

SUMMARY OF THE INVENTION

The present invention provides a pressure regulator that overcomes the disadvantages of the prior art. The regulator includes a housing having a water inlet oriented about 90° with respect to a water outlet. A regulator valve positioned in the outlet is connected to a diaphragm extending across a third opening in the housing. A spring reacting against the diaphragm is captured in the third opening by a removable cap. The spring is selected to provide a substantially constant outlet pressure when the diaphragm is subjected to a range of input pressures. A set of springs to provide a variety of preset outlet pressures is provided with the regulator. The user of the regulator can select the spring that corresponds with the desired outlet pressure, remove the cap from the regulator, and position the desired spring in place. Thus, the invention encompasses both the structure of the system as well as the method.

The present invention has the advantage that only springs need to be replaced rather than the entire pressure regulator in order to obtain a desired outlet flow pressure. The invention has a further advantage that the springs are kept in a separate dry chamber. Only the cap needs to be removed to replace a spring rather than disconnecting an entire line. An operator need only purchase one regulator and a set of springs rather than many different regulators. This of course also reduces cost for dealers and for manufacturers. Also right angle valves allow for higher flows with less pressure drop, in contrast to inline valves.

DETAILED DESCRIPTION OF THE PREFERRED EMBODIMENT

Figure 1A:
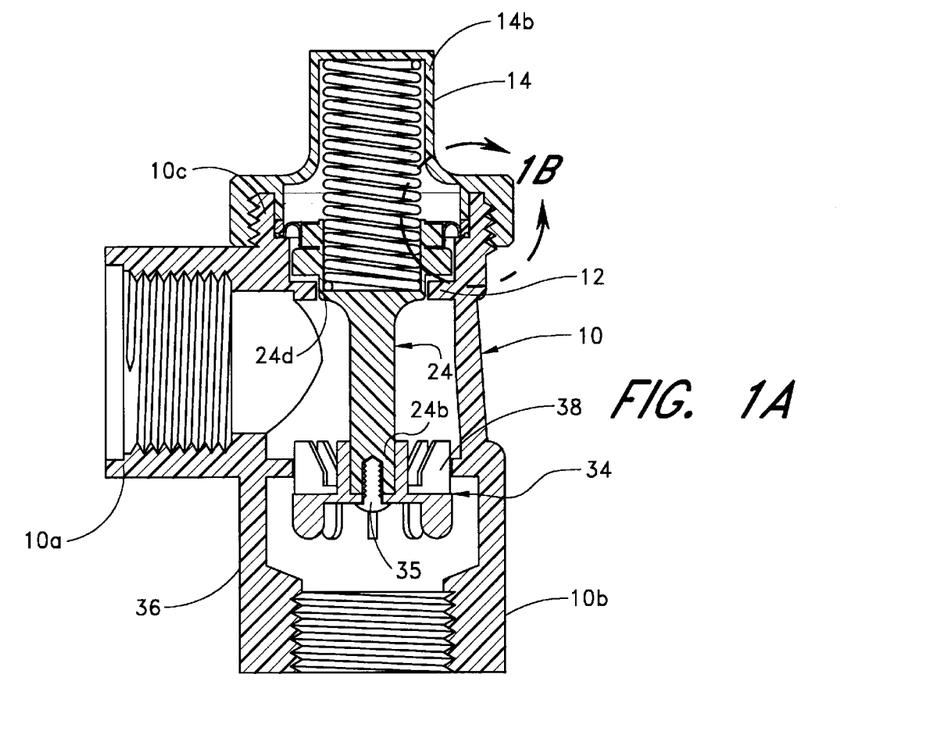
FIG. 1A is a cross-sectional view of one form of the regulator of the invention.

The pressure regulator of FIG. 1A comprises a one-piece housing 10 having a tubular inlet section 10*a*, a tubular outlet section 10*b*, and a tubular pressure regulation section 10*c*. The outlet section is oriented approximately 90° with respect to the inlet section and is axially aligned with the pressure regulation section. The outer ends of both the inlet section 10*a* and the outlet section 10*b* are provided with internal threads to convert with threaded conduits. The pressure regulation section 10*c*, however, is provided with external threads.

Figure 1B:
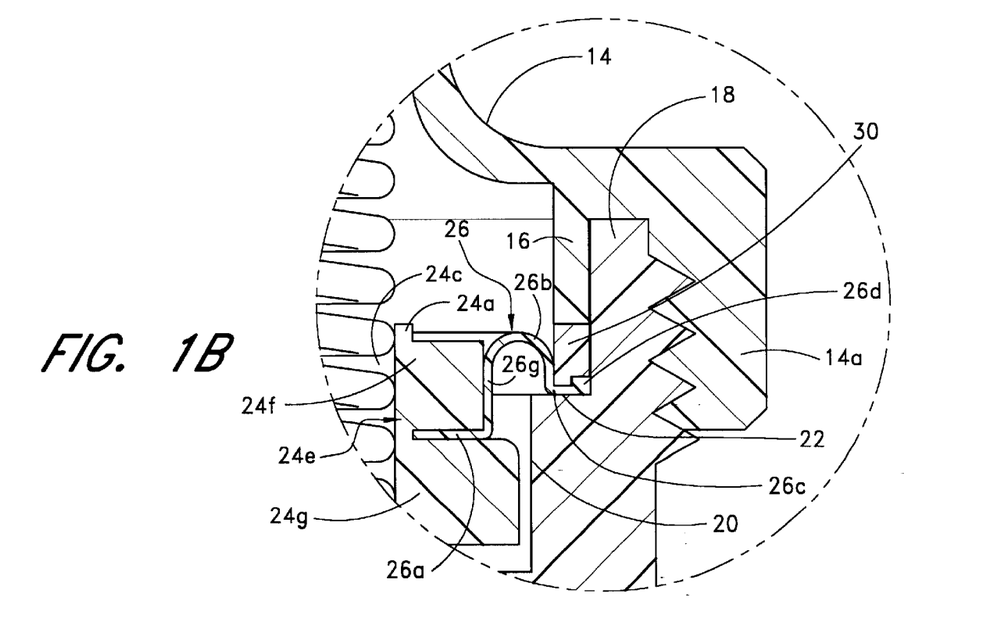
FIG. 1B is an enlarged portion indicated by the broken line 1B in FIG. 1A.

The inner end of the pressure regulation section 10*c* is marked by an inwardly extending annular flange 12. The outer end of the pressure regulation section includes a cap 14 which threads onto the outer end of the housing pressure regulation section. Referring to FIG. 1B, the open end of the cap 14 has an internal cylindrical wall 16 spaced inwardly from the threaded portion 14*a* to define an annular space between it and the threads. This space is slightly larger than the thickness of the cylindrical housing wall outlet 18 so that the housing wall fits into the space when the cap is threaded into place.

The inside cylindrical wall of the closed end of the cap 14 flares outwardly to a larger diameter inner surface of the cylindrical wall 16 on the open end of the cap. An adjacent, axially and radially inner cylindrical housing wall 20 is slightly smaller than the diameter of the outlet end 18. This creates a flat annular flange or seat 22 between those two housing diameters.

Figure 2A:
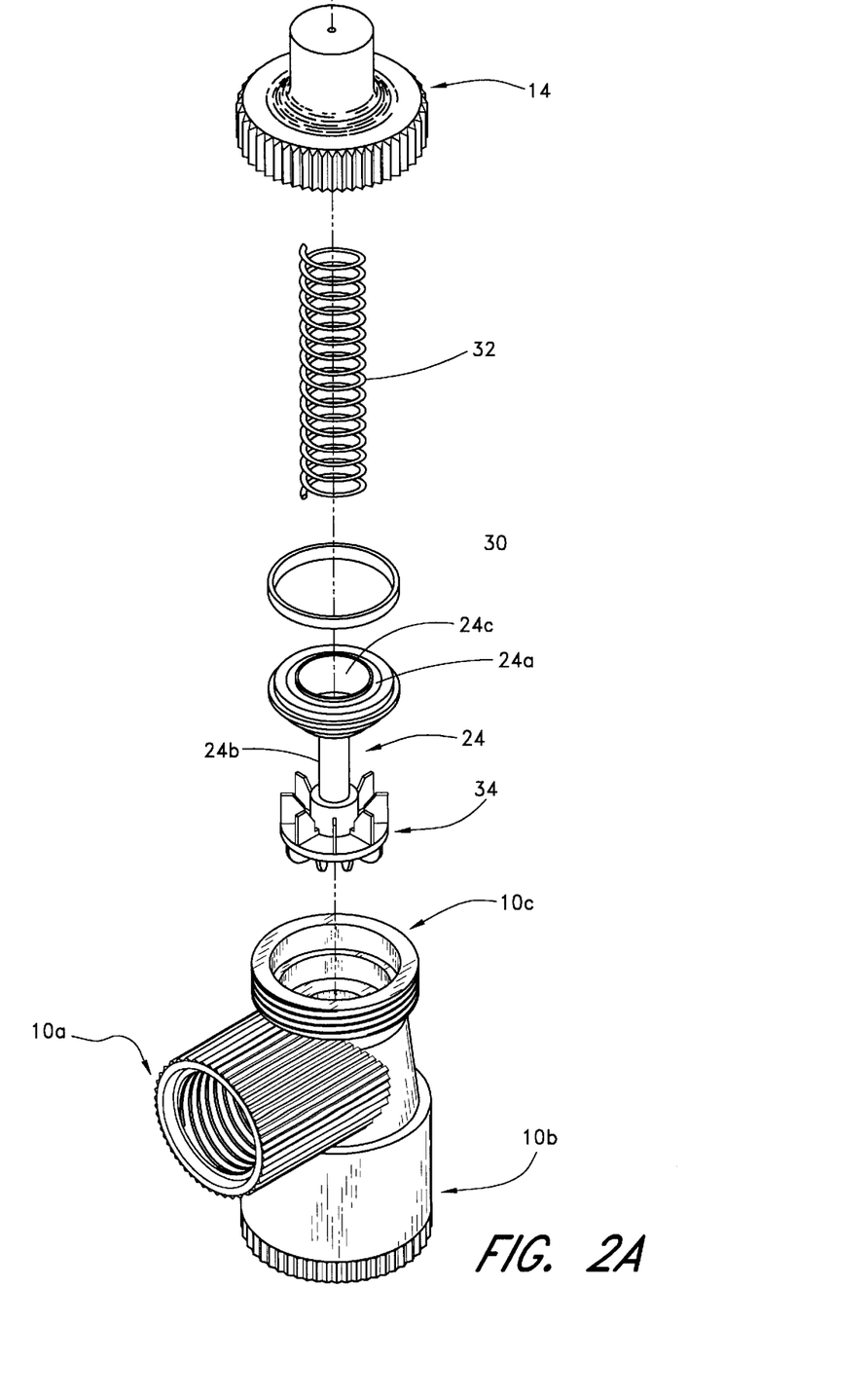
FIG. 2A is an exploded perspective view of the regulator of FIG. 1A.

A diaphragm end 24*a* of a valve stem 24, is positioned in the pressure regulation section 10*c*, with a valve end 24*b* of the stem being in the housing inlet section. A cylindrical socket 24c, seen in FIG. 2A is in the diaphragm end of the valve stem, with the socket open end facing the cap 14. The outer diameter of the socket closed end 24d is slightly smaller than the inner diameter of the housing annular flange 12 so that the valve stem can move axially within the flange. The outside diameter of the open end of the socket is considerably larger than that of the closed end and forms a boss 24e having an upper cylindrical portion 24f and a lower cylindrical portion 24g. These portions are separated by an annular slit open on its radially outer end.

An annular flexible diaphragm 26 surrounds the boss 24e with an inner annular edge 26a of the diaphragm snugly fitting in the slot of boss 24e. The inner edge 26a of the diaphragm is preferably sonically welded to the boss. The outer periphery of the diaphragm forms an annular lip 26c that rests on the housing shoulder 22. As seen from FIG. 1B, the diaphragm includes a cylindrical portion 26g engaging the outer surface of the boss upper cylindrical portion 24f, and extending into an annular portion 26b having an arch shaped cross-section that enables the diaphragm to flex with pressure changes to which it is exposed.

A plastic ring or washer 30 rests on of the diaphragm lip 26c, and the internal cylindrical wall 16 of the cap 14 presses against the washer and clamps the lip against the adjacent shoulder 22. This seals the interior of the housing from the dry chamber within the cap. The cap cylindrical wall rotates on the washer rather than the diaphragm and therefore protects the diaphragm from damage. As seen from FIG. 1B, the washer 30 has an outer annular recess that mates with an upwardly extending annular rib 26d to further secure the diaphragm periphery.

A coil spring 32 is positioned within the cap 14 with one end engaging the inner end of the cap, and its other end engaging the end 24d of the socket. The diaphragm is thus urged inwardly by the spring against the urging of liquid pressure within the housing that reacts against the diaphragm.

A valve element or member 34 is attached to the lower end of the valve stem by a fastener 35 or other suitable means, and cooperates with a surrounding annular valve seat 36 within the housing. The valve seat forms the boundary between the housing inlet section 10a and the outlet section 10b. In the arrangement illustrated, the valve member 34 is positioned on the downstream side of the seat 36, and the spring 32 is urging the valve element away from the valve seat, or in other words, urging the valve member 34 into the valve open position. The diameter of the valve seat 36 is close to the outside diameter of the valve element 34 such that flow would be substantially shut off if the valve member is moved to a position to engage the valve seat. A plurality of axially extending, circumferentially spaced fins 38 on the inlet side of the valve member 34, and a plurality of axially extending, circumferentially spaced fins on the outlet side help straighten the flow passed the valve.

The housing is preferably made of plastic and is designed to be molded. To enable a mold plug to be withdrawn from the housing, the valve seat 36 and the inside wall of the outlet section extending from the valve seat to the outer end of the outlet section is made as a separate piece. This enables the remainder of the housing to be molded as one piece. The valve seat piece, which can also be molded, is then positioned as shown and permanently attached in that position by suitable means, such as sonic welding.

Figure 2B:
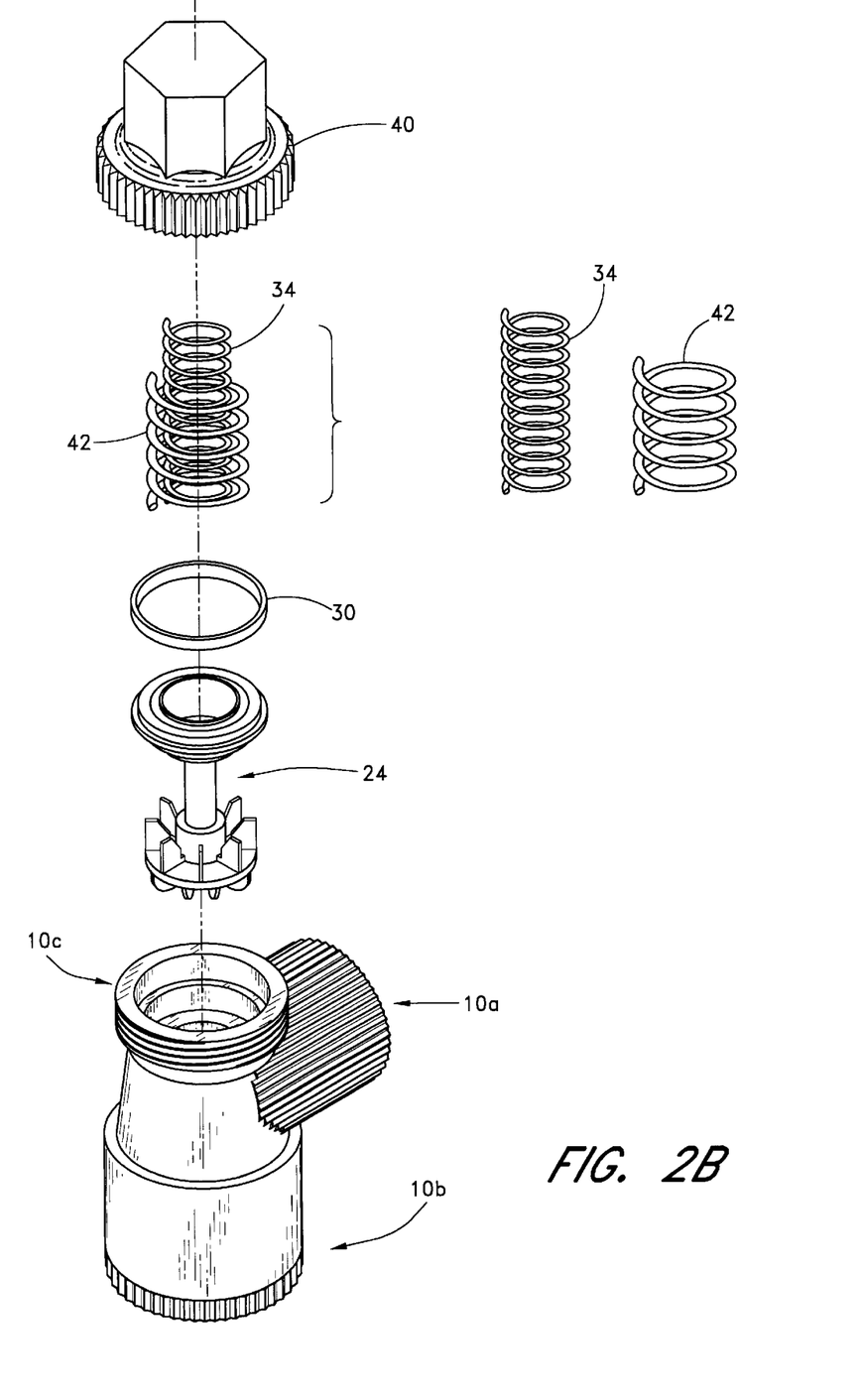
FIG. 2B is an exploded perspective view of another form of the invention.
Figure 4A:
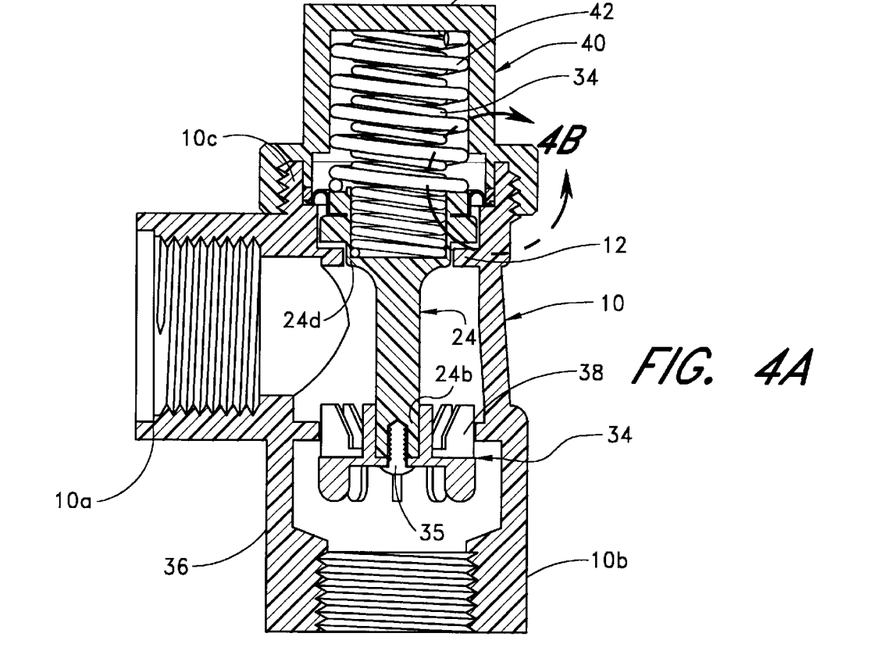
FIG. 4A is a cross-sectional view of the embodiment of FIG. 2B.
Figure 4B:
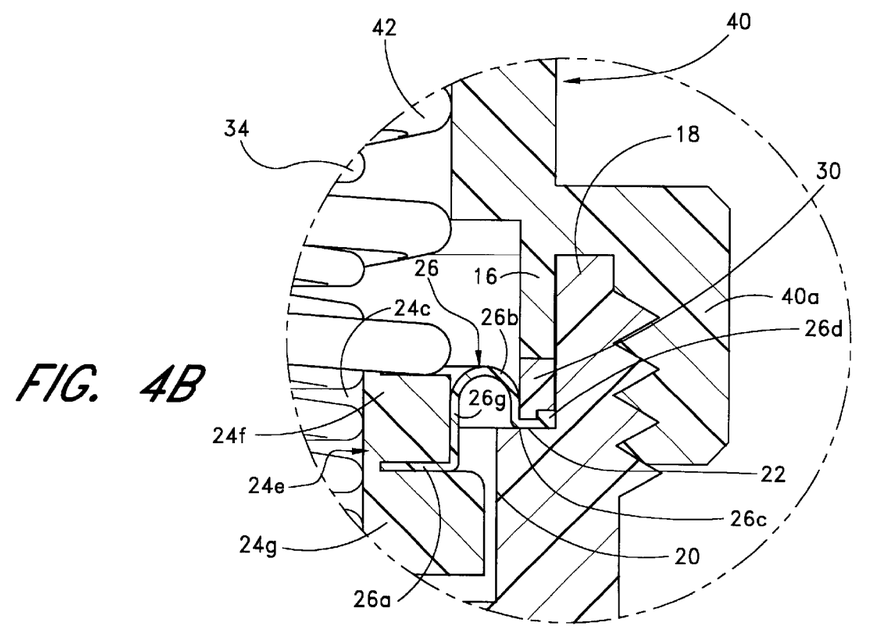
FIG. 4B is an enlargement of the portion of the regulator of FIG. 4A as illustrated by the broken line 4B.
Figure 5A:
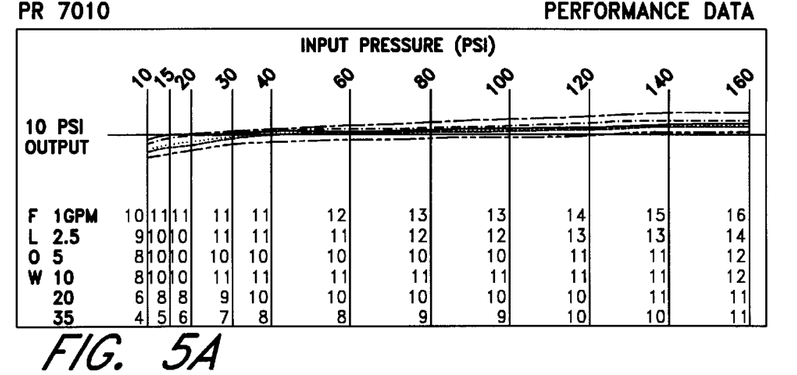
FIGS. 5A–5F illustrate performance data of the regulator of FIG. 1A.
Figure 5B:
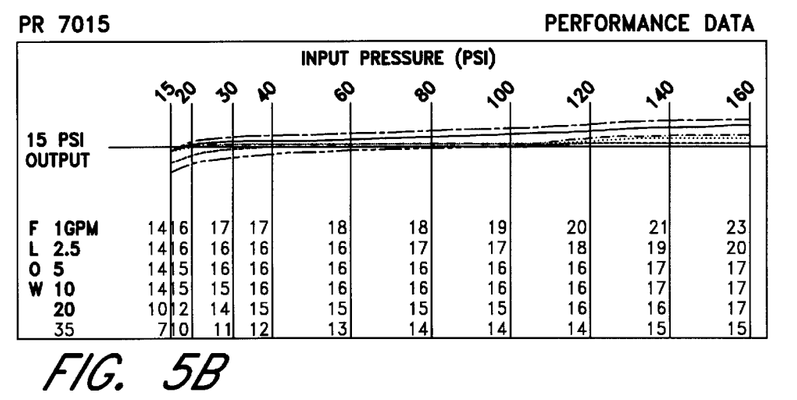
Figure 5C:
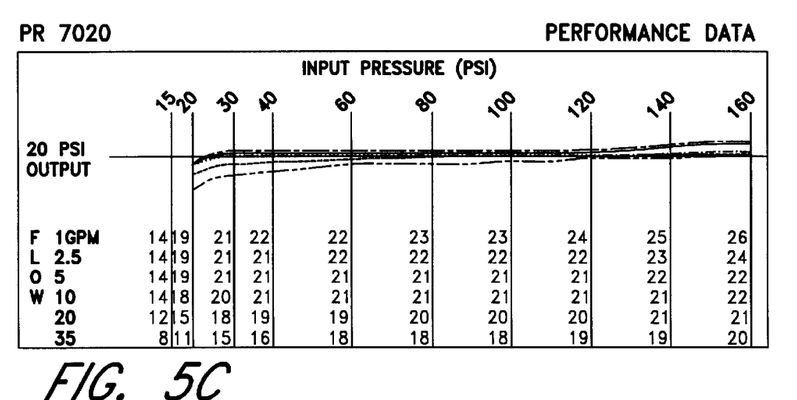
Figure 5D:
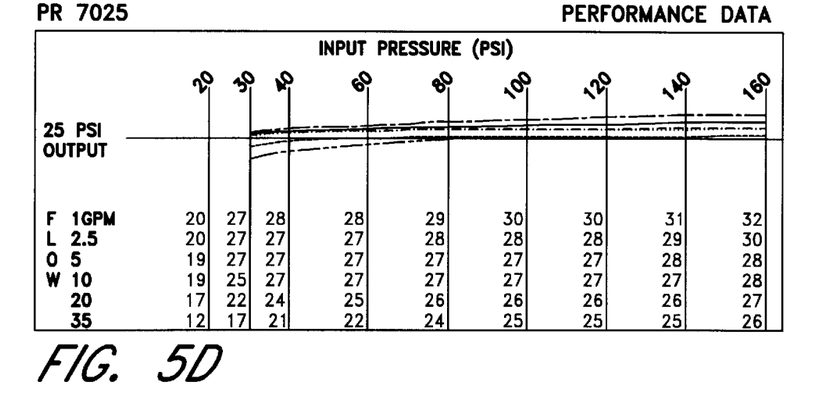
Figure 5E:
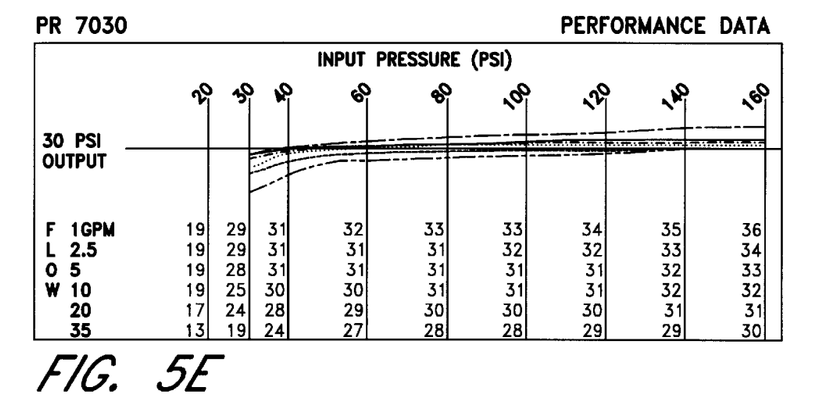
Figure 5F:
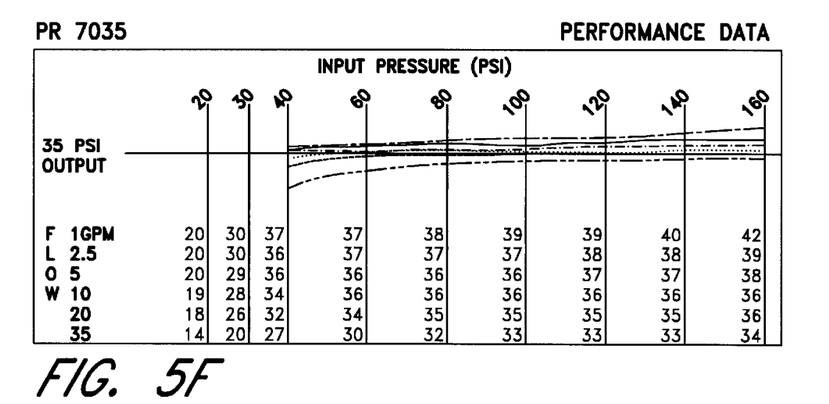
Figure 5G:
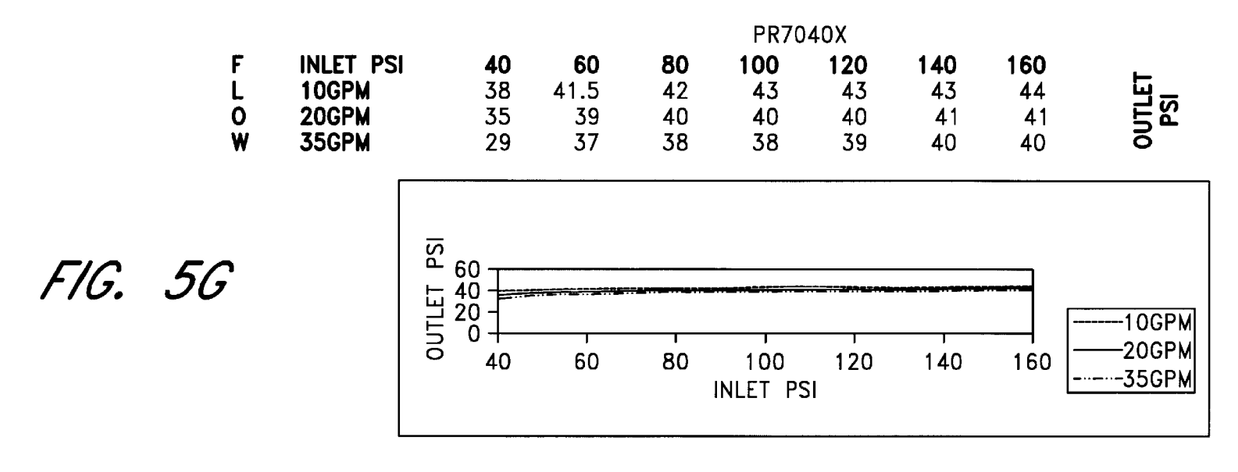
FIGS. 5G–5J illustrated performance data of the regulator of FIG. 4A.
Figure 5H:
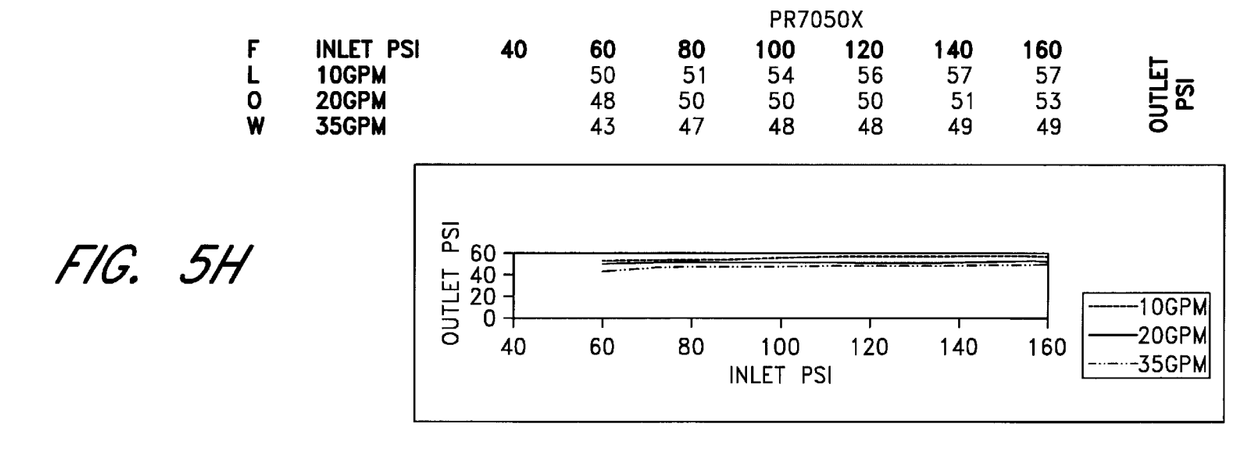
Figure 5I:
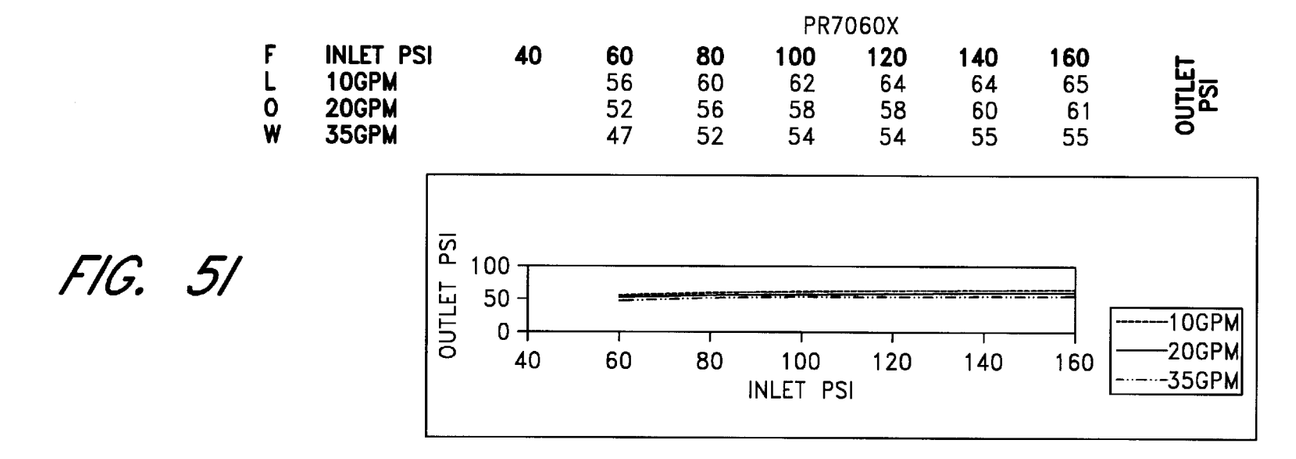
Figure 5J:
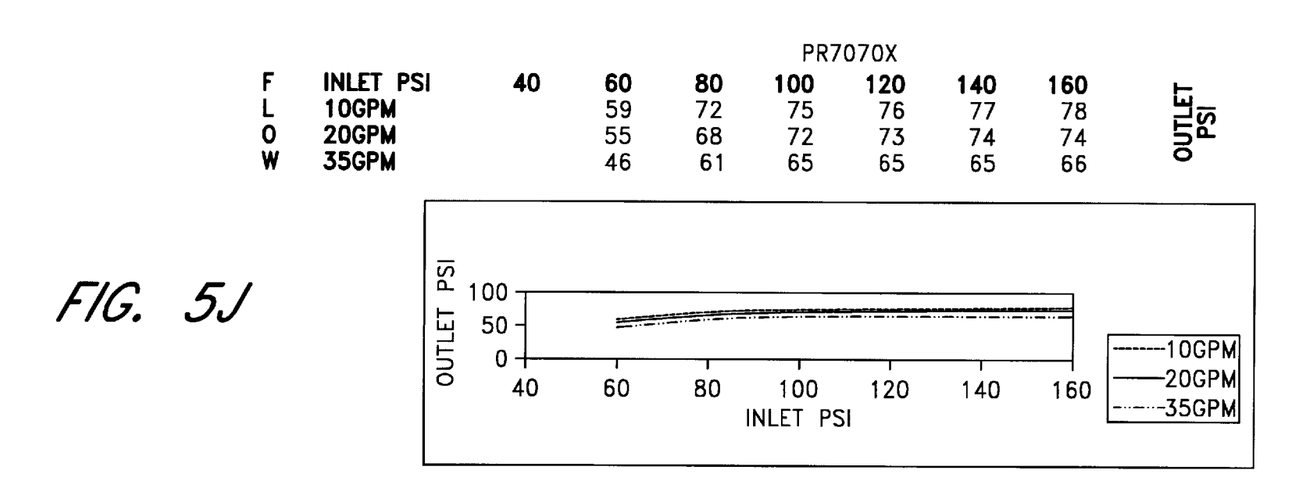

An alternative embodiment of the invention shown in FIGS. 2B, 4A and 4B is identical to that of the first embodiment, except that it has a different cap 40 and can accommodate two springs. The cap 40 of the second embodiment threads onto the housing in the same fashion, but the inner and outer diameters of the outer portion of the cap are larger than that of the second. This enables an outer coil spring 42 to be positioned within the cap concentrically surrounding the inner spring 32. One end of the outer spring is engaged by the cap 46 and the other end engages the end surface of the annular boss 24e formed on the valve stem 24. As seen, the spring 42 has a larger diameter than the spring 24 and is slightly shorter.

In operation, water entering the inlet portion 10a of the housing flows between the valve element 34 and the seat 36, and exists through the housing outlet section 10b. The water pressure in the inlet section is also applied to the diaphragm and the adjacent portion 5 of the valve stem, urging the valve stem in the valve closing direction against the urging of the spring or springs on the valve stem. If the inlet pressure increases, the valve stem will move in the valve closing direction. If the inlet pressure decreases, the valve will move in the valve opening direction. The force provided by the spring or springs will cause a relatively constant outlet pressure, with a variety of input pressures. The desired flow will typically be determined by an upstream valve or restriction in combination with the flow being permitted by downstream components. With the regulator of the invention, the output pressure remains relatively constant over a wide variety of flow rate.

Figure 3A:
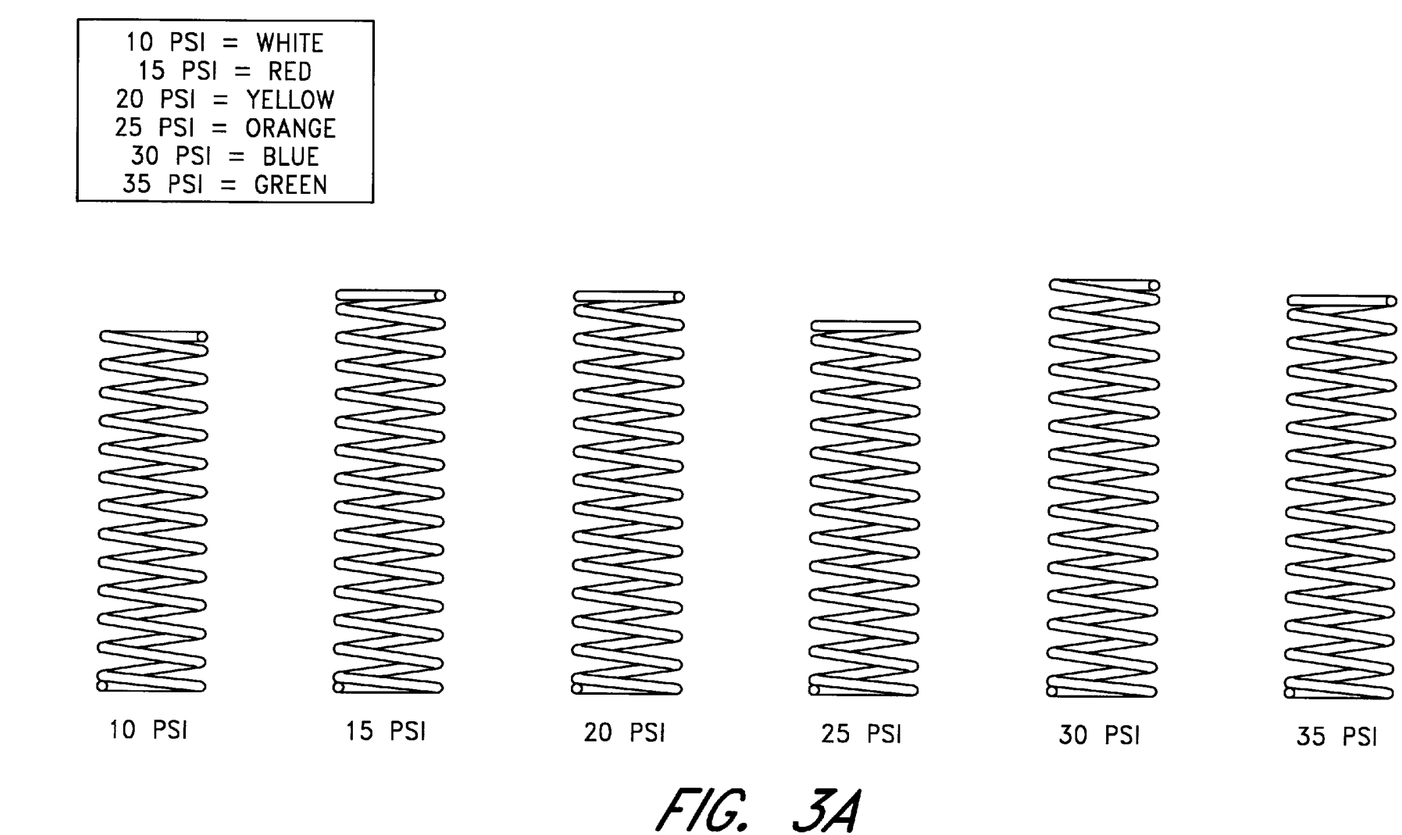
FIG. 3A illustrates a set of springs to be used with the regulators illustrated in FIGS. 2A and 2B.
Figure 3B:
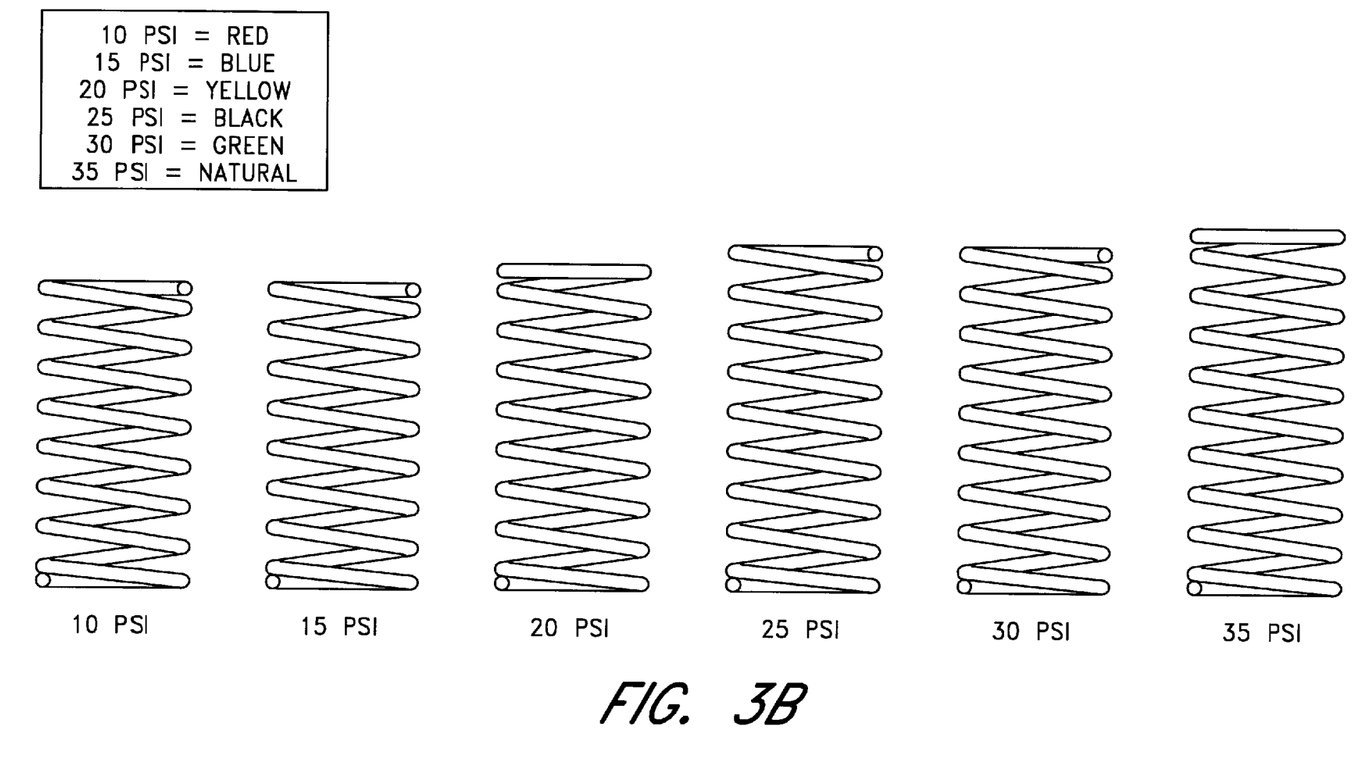
FIG. 3B is an illustration of the springs to be used in connection with the embodiment of FIG. 2B.

The actual outlet pressure is determined by the strength of the spring, or in the case of the dual spring arrangement, is determined by the combination of the strength of the two springs. Thus, the user may select the desired outlet pressures and simply position that spring in the chamber beneath the regulator cap. For example, a set of six springs such as that shown in each of FIGS. 3A and 3B may be provided to enable the user to elect the spring that will provide outlet pressures of 10, 20, 30, 40, or 50 psi.

Preferably, the springs are colored differently to indicate the outlet pressure obtained from it to assist in making the desired choice. The dual spring arrangement is particularly useful when high outlet pressures are desired. With that arrangement, the strengths of the springs are simply added to provide the desired output. Thus, an inner spring calibrated to provide a 10 psi output and an outer spring calibrated to provide a 50 psi output can be utilized when an outlet pressure of 60 psi is desired. Thus, with two sets of springs provided, the full range of outlet pressures may be obtained. Of course, any number of springs may be utilized in whatever outlet pressures are desired. Note that the embodiment of the regulator employing the large cap can be used with only one spring, if desired, and it can be the inner spring or the outer spring. Thus, in that sense, the cap on the first embodiment of the regulator is not necessarily required, although in a single spring arrangement, the small diameter cap is capable of preventing any unlikely buckling of the smaller diameter spring.

The regulators of the invention have provided remarkably consistent results. These are shown in FIGS. 5A through 5F for the single spring version for lower outlet pressures and in FIGS. 5G through 5J for the double spring version for higher outlet pressures. As can be seen from the performance data, the selected springs will provide substantially constant outlet pressure with a variety of input pressures and with a wide range of flow rate. This is highly desirable to provide accurate metering of output flow from the devices at the end of the line. Also, accuracy is highly desirable to prevent damage of any downstream electric control valves. The option of changing springs is a particularly desirable feature of the invention in that an end user, say the operator of a golf course, may encounter a wide range of inlet pressures at different facilities. Regulators of the invention enable an operator to simply select the proper spring to provide the desired outlet pressure. This can be done without disconnecting the regulator from the water line. Instead, it is only necessary to unscrew the cap and replace the spring with the desired one.

The versatility of providing the desired outlet pressure over a wide range of flows is very advantageous. For example, it may be desirable to have a line leaving the outlet section that is connected to two different lines, each having its own on/off valve. One line may, for example, be connected to a series of sprinkler heads that require high flow, and the other line may lead to drip irrigation outlets that require very low flow. Both control valves may function adequately with the same output pressure. Thus, if the sprinklers are to be operated in the morning and require high flow, the regulator of the invention will provide such, while maintaining a constant outlet pressure. In the afternoon, if it is desired to provide water to the drip irrigation outlets, the regulator will still provide the desired outlet pressure to the control valve with the greatly reduced flow rate.

What is claimed is:

1. Pressure regulator apparatus for use in a water distribution system comprising:
    a housing having a liquid passage therethrough including an inlet section and an outlet section oriented about 90 degrees with respect to the inlet section;
    a valve seat formed in said outlet section;
    a valve element cooperating with said valve seat to control the flow of liquid from the inlet section to the outlet section;
    a valve stem attached to said element and extending through a portion of the inlet section and into a pressure regulation section;
    a diaphragm positioned in and extending across said regulator section so that one side of the diaphragm is exposed to the liquid pressure within the inlet section and the other side of the diaphragm is not in contact with the liquid so as to create a dry chamber;
    at least one spring positioned in said chamber; and
    a removable cap closing said dry chamber and compressing the spring between the cap and the diaphragm so that the pressure of the spring opposes the pressure of the liquid within the inlet section;
    said valve seat, said valve element, said diaphragm and said spring being configured to provide a substantially constant outlet pressure over a wide range of input pressure and to maintain substantially uniform flow rates over a wide range of selected flow rates, said outlet pressure being a function of the compressive strength of the spring, and said cap being readily removable so that the spring may be selected from a group of springs of varying strength to obtain the desired outlet pressure.

2. The apparatus of claim 1, wherein said regulator section is axially aligned with the outlet section.

3. The apparatus of claim 1, including:
    a cylindrical wall in said outlet section;
    and a separate tubular member which is bonded to said cylindrical wall, said valve seat being located on one end of said member, the end of said member opposite from the valve seat being internally threaded for mating with a downstream conduit.

4. The apparatus of claim 3, wherein said valve element has an outer diameter which is larger than the inner diameter of the threaded end.

5. The apparatus of claim 1, in which two springs are concentrically positioned within said chamber to provide a combined load against said diaphragm.

6. The apparatus of claim 1, including a washer in said dry chamber extending between the diaphragm and the cap.

7. The apparatus of claim 1, wherein said diaphragm has a generally annular configuration with an inner portion surrounding and secured to said valve stem, and an outer peripheral portion which is clamped against a shoulder in said housing by said cap.

8. The apparatus of claim 7, in which said valve stem has a socket having an open end facing said cap, the socket being configured to receive one end of said spring while the other end of the spring reacts against said cap.

9. The apparatus of claim 8, including a second coil spring surrounding said at least one spring, said second spring having one end reacting against an end of said valve stem and having a second end reacting against said cap.

10. The apparatus of claim 9, wherein said diaphragm has a flexible, annular portion between said shoulder and said valve stem that enables the valve stem to move in response to the forces produced by said springs and liquid pressure admitted through said inlet section.

11. The apparatus of claim 7, wherein said diaphragm has a flexible, annular portion between said shoulder and said valve stem that enables the valve stem to move in response to the forces produced by said springs and liquid pressure admitted through said inlet section.

12. Pressure regulator apparatus for use in a water distribution system comprising:
    a regulator housing having a liquid passage therethrough;
    a valve in said housing including a valve stem;
    a diaphragm connected to said valve stem and mounted in said housing in a manner to be exposed to liquid pressure in the housing so as to cause the valve stem to move in a valve closing direction in response to an increasing liquid pressure within the housing;
    at least one coil spring positioned in the housing in a manner to urge said valve stem in a direction to oppose the liquid pressure; and
    a set of springs having different spring strengths to enable a user of the regulator to be able to select the desired spring to be placed in the housing, said springs and said diaphragm and valve being configured to provide a relatively constant outlet pressure dependent upon the strength of the spring selected.

13. The apparatus of claim 12, including a second coil spring positioned in said housing concentrically surrounding said one spring and being positioned to urge the valve stem in a direction opposite to that of the liquid pressure reacting against the diaphragm whereby the substantially constant output pressure is a function of the combined strengths of the two springs.

14. A method of providing a variety of preset, substantially constant regulator outlet pressures with a wide range of input pressure to the regulator and with a wide range of flow through the regulator, said method comprising the steps of:
    introducing inlet pressure to the regulator;
    applying the inlet pressure to a diaphragm connected to a valve stem which supports a valve element and controls the flow of liquid through the regulator to an outlet downstream of the valve element;

selecting a spring from a group of springs, each of which is calibrated to produce a desired outlet pressure; and compressing the selected spring between the diaphragm and a removable cap closing a dry chamber in the regulator to bias said diaphragm against the inlet pressure.

15. The method of claim 14, including the step of positioning a second spring within said chamber with each of the springs being compressed between the cap and the diaphragm so that the force provided against the diaphragm is the sum of the strength of the two springs selected whereby a desired range of desired outlet pressures may be obtained, simply by removing the cap and positioning selected springs in said chamber.

* * * * *